Feb. 17, 1959 O. METZLER 2,874,243
DEVICE FOR AUTOMATICALLY INDICATING THE CRITICAL OIL LEVEL
IN ENGINES, ESPECIALLY ENGINES OF MOTOR VEHICLES
Filed April 19, 1957
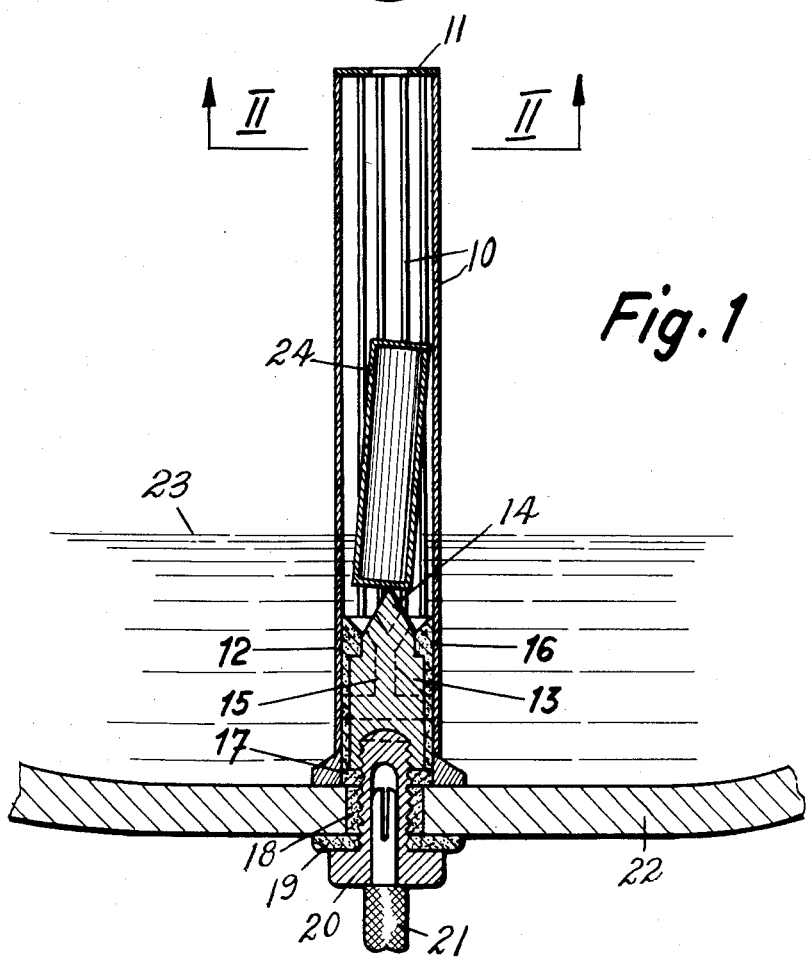
INVENTOR
Otto Metzler
By Lowry & Rinehart
ATTYS.

United States Patent Office 2,874,243
Patented Feb. 17, 1959

2,874,243

DEVICE FOR AUTOMATICALLY INDICATING THE CRITICAL OIL LEVEL IN ENGINES, ESPECIALLY ENGINES OF MOTOR VEHICLES

Otto Metzler, Offenbach, Main, Germany

Application April 19, 1957, Serial No. 653,887

3 Claims. (Cl. 200—84)

The present invention relates to a device for automatically indicating the critical oil level in engines, especially engines of motor vehicles, in which a metallic float is accommodated freely movable in a metal tube and closes an electric circuit when the oil level drops to a critical point.

Devices of this type are known in the form of oil measuring rods for crank-cases of motors. The function of these oil measuring rods as regards the actual oil level in the crank-case at a given time is, however, dependent upon the rods fitting sufficiently deeply and firmly in a hole provided for their reception in the crankcase, as a partial introduction due to lack of care or also a slight slipping out of the rods due to vibration when travelling, result in changes in the measurement reading which does not correspond to the actual conditions.

Based on the function of the oil measuring rods mentioned at the outset, the invention sets out to produce an indicating device which overcomes these objections.

The invention will be readily apparent from the following description when taken in connection with the accompanying drawing, which illustrates by way of example a preferred embodiment of the invention and in which:

Fig. 1 is a longitudinal section of an indicating device rigidly fitted in the oil sump of an engine, and Fig. 2 is a cross section of the device taken on line II—II of Fig. 1.

The device consists substantially of a tube 12 which is immovably secured in vertical position to the bottom portion of the oil sump 22 of a crank-case and which accommodates a freely movable metal float 24. The tube 12 can be provided with apertures extending in longitudinal direction in the range of movement of the float 24 so as to effect a rapid equalization of the oil level inside and outside the tube. In the example illustrated the part of the tube 12 in question is formed by rods 10 set in a circle defining the periphery of the tube and held together at their free ends by a plate 11.

In the lower end of the tube 12 a contact nipple 13 is firmly fitted and electrically insulated from the tube by a non-conductive intermediate layer 16. At its upper end the nipple 13 is provided with a central contact point 14, preferably of conical shape, projecting beyond the insulation freely into the interior of the tube 12 and on which the metal float 24 rests when the oil level 23 drops to the critical point, so that the upper end of the float tips over and contacts the rods 10 thereby electrically connecting the nipple 13 with the tube 12 and the oil sump 22 (earth). The tube 12 is fixed on the bottom of the oil sump 22 by a screw 20 which passes into the sump 22 from outside and engages a screw thread in the nipple 13. By interposing insulating members 17, 18 and 19 the screw 20 and the nipple 13 are electrically insulated from the bottom of the sump 22 and consequently also from the tube 12. By means of a contact arrangement, for example a plug contact 21, the contact nipple 13 is electrically connected up with an optical or acoustic signalling device arranged, for example, on the dashboard of a motor vehicle.

When the oil level reaches the critical point in the oil sump 22, as illustrated in Fig. 1 of the drawing, the float automatically closes the circuit from the battery to the signalling device (not shown in the drawing) via sump (earth) 22, tube 12, contact nipple 13, screw 20 and contact 21. 15 designates a system of passages which extends through the lower part of the tube 12 and the nipple 13 in the direction towards the contact point 14, so as to prevent oil suction below the seated float 24 when the oil level 23 rises.

The indicating device according to the invention requires no servicing whatsoever and necessitates only minor alterations in the bottom of the oil sump and renders the device, which may be readily fitted in every crank-case, absolutely reliable in operation because direct or indirect influencing of the device from outside is no longer possible.

From the above detailed description of the invention, it is believed that the construction will at once be apparent, and while there is herein shown and described a preferred embodiment of the invention, it is nevertheless to be understood that minor changes may be made therein without departing from the spirit and scope of the invention as claimed.

I claim:

1. A device for automatically indicating the critical oil level in oil sumps of engines, especially engines of motor vehicles, comprising in combination a metal tube arranged vertically upright in the oil sump and held immovable in electric conducting connection with the bottom part of said oil sump, a metal float freely movable in said tube, and electric contact means adapted to be influenced by said float and electrically insulated both from the tube and also from the oil sump, said contact means extending through the bottom part of the oil sump, said tube being formed by rods of metallic material arranged in a circle defining the periphery of the tube.

2. A device for automatically indicating the critical oil level in oil sumps of engines, especially engines of motor vehicles, comprising in combination a metal tube arranged vertically upright in the oil sump and held immovable in electric conducting connection with the bottom part of said oil sump, a metal float freely movable in said tube, and electric contact means adapted to be influenced by said float and electrically insulated both from the tube and also from the oil sump, said contact means extending through the bottom part of the oil sump with its upper end immersed in the oil in the sump.

3. A device as set forth in claim 2, wherein the electric contact means consists of a contact nipple firmly fitted in the lower part of the tube and electrically insulated therefrom by an intermediate layer of insulating material spacing the nipple from the tube, said nipple having a point projecting freely beyond the insulation into the tube in the path of movement of the float, and a screw provided with an electric connection contact passing through the electric insulation from the outside and fixing the tube on the bottom of the sump.

References Cited in the file of this patent

UNITED STATES PATENTS

| | | |
|---|---|---|
| 1,243,470 | White | Oct. 16, 1917 |
| 1,669,684 | Von Scheven | May 15, 1928 |
| 2,076,454 | Foxwell | Apr. 6, 1937 |